(12) United States Patent
Chuang

(10) Patent No.: US 9,386,520 B2
(45) Date of Patent: Jul. 5, 2016

(54) METHOD FOR REGISTERING MOBILE NETWORK AND MOBILE COMMUNICATION APPARATUS

(71) Applicant: Acer Incorporated, New Taipei (TW)

(72) Inventor: Yeh-Kuo Chuang, New Taipei (TW)

(73) Assignee: Acer Incorporated, New Taipei (TW)

( * ) Notice: Subject to any disclaimer, the term of this patent is extended or adjusted under 35 U.S.C. 154(b) by 195 days.

(21) Appl. No.: 14/181,745

(22) Filed: Feb. 17, 2014

(65) Prior Publication Data

US 2015/0163736 A1 Jun. 11, 2015

(30) Foreign Application Priority Data

Dec. 11, 2013 (TW) ............................. 102145609 A

(51) Int. Cl.
*H04W 52/02* (2009.01)
*H04W 60/06* (2009.01)
*H04W 76/06* (2009.01)
*H04W 60/00* (2009.01)

(52) U.S. Cl.
CPC ...... *H04W 52/0209* (2013.01); *H04W 52/0206* (2013.01); *H04W 52/0225* (2013.01); *H04W 60/06* (2013.01); *H04W 76/06* (2013.01); *H04W 60/005* (2013.01)

(58) Field of Classification Search
CPC ............ H04W 36/00; H04W 36/0005; H04W 52/0209; H04W 60/00; H04W 60/06
See application file for complete search history.

(56) References Cited

U.S. PATENT DOCUMENTS

| 2004/0192295 | A1* | 9/2004 | Tsao ...................... H04W 36/14 455/432.1 |
| 2006/0184795 | A1* | 8/2006 | Doradla ................. H04L 63/08 713/167 |
| 2011/0103305 | A1 | 5/2011 | Ali et al. |
| 2013/0083649 | A1* | 4/2013 | Denny .................. H04W 24/04 370/216 |

FOREIGN PATENT DOCUMENTS

| CN | 102685832 | 9/2012 |
| CN | 102823281 | 12/2012 |
| EP | 1998517 | 12/2008 |

* cited by examiner

Primary Examiner — Anh Ngoc Nguyen
(74) Attorney, Agent, or Firm — Jianq Chyun IP Office

(57) ABSTRACT

A method for registering mobile network and a mobile communication apparatus are provided. The method is adapted to the mobile communication apparatus and the method includes following steps. At least one available wireless network is detected. Whether connecting to the wireless network is determined. When connecting to the wireless network, the registration to the packet switch network is canceled.

9 Claims, 1 Drawing Sheet

METHOD FOR REGISTERING MOBILE NETWORK AND MOBILE COMMUNICATION APPARATUS

CROSS-REFERENCE TO RELATED APPLICATION

This application claims the priority benefit of Taiwan application serial no. 102145609, filed on Dec. 11, 2013. The entirety of the above-mentioned patent application is hereby incorporated by reference herein and made a part of this specification.

BACKGROUND

1. Field of the Invention

The invention generally relates to a mobile network connecting technology, and in particular, to a method for registering mobile network and a mobile communication apparatus.

2. Description of Related Art

With the popularity of the wireless network, a lot of mobile communication apparatus may be used to connect to the Internet with wireless network components, such as connecting to the network through built-in wireless network cards, or using mobile data, such as the Third Generation (3G), for connecting to the network through the service provided by the communication operators Generally, when the mobile communication apparatus is used for mobile data accessing, it may register the Circuit Switched (CS) network and the Packet Switched (PS) network. The CS network is registered for the voice calls, such as making a phone call, and the PS network is registered for the mobile data network accessing. Wherein, when using the mobile data network, it may start receive the Packet Data Protocol (PDP) context after registering the PS network for obtaining Internet Protocol (IP) address.

However, in the prior art, when the mobile communication apparatus is changed from the mobile data network accessing to the wireless network accessing, such as connecting to wireless network conformed to Wide Fidelity (Wi-Fi) standard, although the mobile communication apparatus will stop receiving the PDP context, it still keeps registering the PS network. Therefore, the mobile communication apparatus still has to consume a lot of power to keep registering the PS network, and the provider of the PS network is also unable to release the space of registration.

SUMMARY

The invention provides a method for registering mobile network and a mobile communication apparatus, which may reduce the power consumption of the mobile communication apparatus and reduce the burden of the base station.

The invention provides a method for registering mobile network. The method is adapted to the mobile communication apparatus and the method includes following steps. At least one available wireless network is detected. Whether connecting to the wireless network is determined. When connecting to the wireless network, the registration to the packet switch network is cancelled.

The invention provides a mobile communication apparatus, comprising a detecting module, a network communication module and a control module. The detecting module detects at least one available wireless network. The network communication module coupled to the detecting module is configured to connect to the wireless network. The control module is coupled to the detecting module and the network communication module, wherein the control module determines whether the network communication module is connected to the wireless network, and the control module lets the network communication module cancel the registration to the packet switched network when the network communication module is connected to the wireless network.

Based on the above, the invention provides the method for registering mobile network and the mobile communication apparatus. When the mobile communication apparatus is connected to the wireless network, the network communication module may cancel the registration to the packet switched network; therefore, the mobile communication apparatus may reduce the power consumption of registering the packet switched network and may also reduce the burden of the provider of the packet switched network, such as the operator's base station.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Since the circuit switched (CS) network and the packet switched (PS) network will be registered while the mobile data network is used, when the mobile communication apparatus does not use the mobile data network, it is bound to avoid the power consumption of registering the PS network if it is able to unregister the PS network only. The invention provides the method of registering mobile network and the mobile communication apparatus according to the viewpoint described above. Below, exemplary embodiments will be described in detail with reference to accompanying drawings so as to be easily realized by a person having ordinary knowledge in the art.

Figure 1:
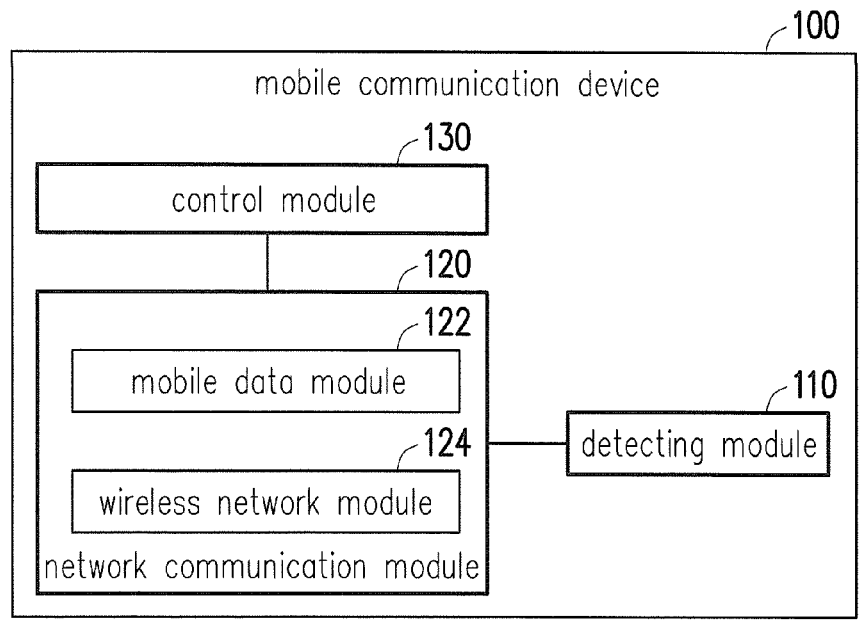
FIG. 1 is a block diagram illustrating a mobile communication apparatus according to an embodiment of the invention.

FIG. 1 is a block diagram illustrating a mobile communication apparatus according to an embodiment of the invention. Referring to FIG. 1, the mobile communication apparatus 100, such as a mobile phone, a personal digital assistant (PDA) phone, or Smart phone, etc. or other portable communication devices, but it is not limited thereto. The mobile communication apparatus 100 comprises a detecting module 110, a network communication module 120, and a control module 130, and the functions are respectively described as below.

The detecting module 110 is configured to detect at least one available wireless network. Herein, the detecting module 110 may be constituted by the wireless sensor, which the main function thereof is for detecting the wireless network signal in the predetermined sensing region. For example, the detecting module 110 detects the wireless network packets which are conformed to Wide Fidelity (Wi-Fi) standard or the Wireless WAN protocol of the Worldwide Interoperability for Microwave Access (WiMAX), but it is not limited thereto.

The network communication module 120 is coupled to the detecting module 110, wherein the network communication module 120 may include the Third Generation Telecommunication (3G) module, the Long Term Evolution (LTE) communication module or Wi-Fi module, etc., but it is not limited thereto. Specifically, the network communication module 120 of the present embodiment may include a mobile data module 122 and a wireless network module 124. The mobile data module 122 is configured to register or unregister the CS network, register or unregister the PS network, and receive or stop receiving PDP context. The wireless communication module 124 is connected to the wireless network, wherein the wireless network is conformed to Wi-Fi, LTE, or Bluetooth standard, etc. or other wireless communication protocols.

The control module 130 is coupled to the network communication module 120. The control module 130 may determine whether the network communication module 120 is connected to the mobile data network, and the operation mode of the network communication module 120 is switched. Specifically, the control module 130 is configured to transmit the request command to the network communication module 120, wherein the request command is, such as one of the command of registering the PS network, the command of un-registering the PS network, the command of registering the CS network, the command of un-registering the CS network, the command of starting receiving PDP context, or the command of cancelling receiving PDP context, etc., but it is not limited thereto. Such that, the network communication module 120 may determine whether to register the PS or CS network or to receive the PDP context according to the said request commands. In the present embodiment, if the network communication module 130 is connected to the wireless network, or disconnected to the mobile data network, the control module 130 may transmit the request command of un-registering the PS network and let the network communication module 120 unregister the PS network.

Besides, the said detecting module 110, the network communication module 120, and the control module 130, such as the hardware composed by the logic circuit elements, for enforcing the method of registering the mobile network in the present embodiment. Or, the detecting module 110, the network communication module 120, and the control module 130 may be a program stored in the storage medium (such as the memory or hard disk) of the mobile communication apparatus 100, which may be loaded to the processing unit of the mobile communication apparatus 100 to perform the method of the registering mobile network in the present embodiment, but it is not limited thereto.

In order to let those skilled in the art further understand the method of registering mobile network in the present embodiment and the mobile communication apparatus using the same, the following comes with the said mobile communication apparatus 100 to describe each procedures of the method of registering mobile network.

It needs to be noted that, before the mobile communication apparatus 100 performs the method of registering the mobile network in the present embodiment, the network communication module 120 may be connected to the operator's base station (not illustrated) and perform the PS attach to register the PS network. And, the network communication module 120 may also establish a corresponding PDP context to achieve the Internet Protocol (IP) address. Certainly, in another embodiment, the network communication module 120 may also only register the PS network, but may not start receive the PDP context. Or, in another embodiment, the network communication module 120 may also register the PS network and the CS network simultaneously to let the user make a phone call or send short news, etc. If the network communication module 120 has registered the PS network as follow, but it is not limited to whether register the CS network or start receiving the PDP context.

Figure 2:
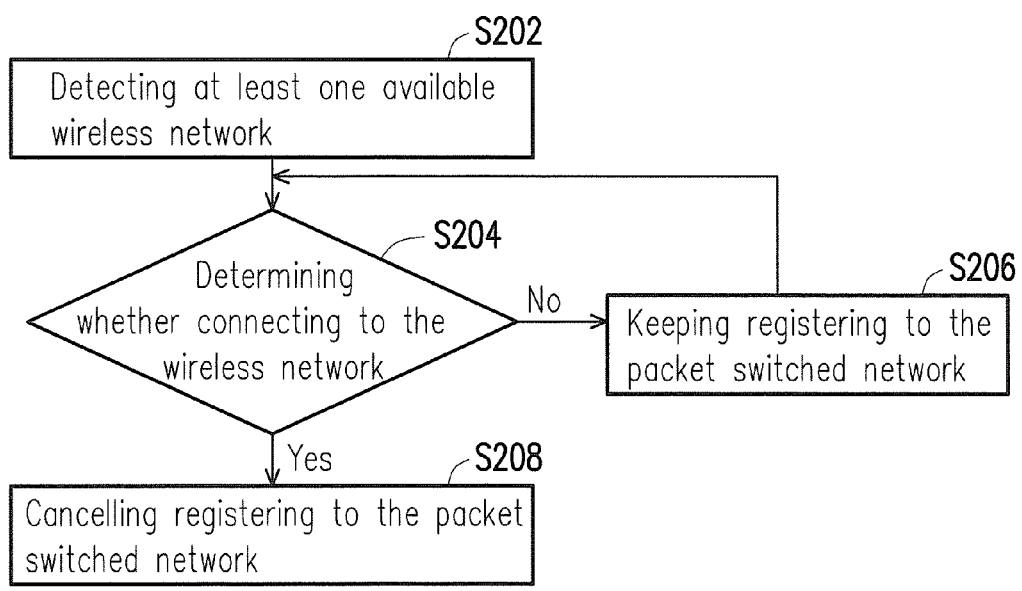
FIG. 2 is a flow chart diagram illustrating a method for registering mobile network according to an embodiment of the invention.

FIG. 2 is a flow chart diagram illustrating a method for registering mobile network according to an embodiment of the invention. Referring to FIG. 2, in step S202, the detecting module 110 may detect at least one available wireless network. For example, the detecting module 110 may detect whether there is a wireless access point in the predetermined sensing range for providing network resources. In the present embodiment, the detecting module 110 may detect whether there is available Wi-Fi or Bluetooth etc. network.

In step S204, the control module 140 may determine whether the network communication module 120 is connected to the wireless network. Wherein, the connecting method of wireless network executed by the network communication module 120 may be carried out by the users performing a command of connecting to the Internet on the mobile communication apparatus 100 manually, and may be carried out by the network communication module 120 connecting to the saved default wireless accessing point automatically, but it is not limited thereto.

When the network communication module 120 is not connected to the wireless network, the network communication module 120 may keep registering the PS network as shown in step S206. In other embodiments, the network communication module 120 may also receive the PDP context to obtain IP address. Herein, the control module 140 may keep performing step S204 to determine whether the network communication module 120 is connected to the wireless network.

However, when the network communication module 120 is connected to the wireless network, the control module 130 may let the network communication module 120 unregister the PS network as shown in step S208. Herein, the control module 130 may transmit a request command of unregistering the PS network so as to let the network communication module 120 perform the unregistering procedure, such that it may reduce the power consumption of keeping the registration. In other embodiments, the control module 130 may also further transmit the request command of the un-receiving the PDP context to the network communication module 120 so as to let the communication module 120 stop receiving the PDP context, such that control module 130 releases the current IP address in the mobile communication apparatus 100.

Besides, the control module 130 may also transmit the request command of un-registering the PS network and keeping registering to the CS network to the network communication module 120 so that the network communication module 120 may keep registering to the CS network when un-registering the PS network. That is, if the network communication module 120 is connected to the CS network which has registered before, the request command transmitted by the control module 130 may let the network communication module 120 unregister the PS network, such that it changes the mobile data accessing to the wireless network accessing and keeps the connection of the CS network to let the users operate the call function of the mobile communication apparatus 100.

It should be noted that the user may control the network communication module 120 manually to unregister the PS network. For example, if the users turn off the mobile data network manually, such as turning off the function of 3G mobile data network, the control module 130 may transmit a request command of un-registering the PS network to the network communication module 120 to let the network communication module 120 unregister the PS network. Or, when the users turn on the airplane mode or roaming mode, the control module 130 may also transmit the request command of un-registering the PS network to the network communication module 120 to let the network communication module 120 unregister the PS network. Or, when the users tend to connect to another PS network, the control module 130 may transmit the request command of un-registering the original PS network to the network communication module 120 to let the network communication 120 unregister the original PS network. The above is as an example, but the present embodiment is not limited thereto.

To sum up, the present embodiment provides the method for registering mobile network and the mobile communication apparatus, when the mobile communication apparatus is changed from the mobile data network to the wireless network, the mobile communication apparatus may unregister the PS network. Or, when the mobile communication apparatus stops using the wireless network accessing, the mobile communication apparatus may also unregister the PS network. And, after the mobile communication apparatus unregisters the PS network, it may also keep registering the CS network. Such that, the mobile communication apparatus may reduce the power consumption of registering the PS network and may also reduce the burden of the provider of the PS network (such as operator's base station) to release the registering space of the PS network.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for a mobile communication apparatus to register mobile network, the method comprising:
   detecting at least one available wireless network;
   determinining whether to connect to the wireless network; and
   cancelling the registration to a packet switched network when connecting to the wireless network, wherein the step of cancelling the registration to the packet switched network comprises:
   the transmitting a request command to a network communication module of the mobile communication apparatus for cancelling the registration to the packet switched network and keeping registering to a circuit switched network.

2. The method according to claim 1, wherein when connecting to the wireless network, the method further comprises:
   stopping receiving a packet data protocol context.

3. The method according to claim 2, further comprising:
   receiving the packet data protocol context continuously when disconnecting to the wireless network.

4. The method according to claim 1, further comprising:
   keeping registering to the packet switched network when disconnecting to the wireless network.

5. A mobile communication apparatus comprising:
   a detecting module configured to connect to at least one wireless network;
   a network communication module coupled to the detecting module, configured to connect to the wireless network; and
   a control module coupled to the detecting module and the network communication module, wherein the control module determines whether the network communication module is coupled to the wireless network, and the control module let the network communication module cancel the registration to a packet switched network when the network communication module is connected to the wireless network,
   wherein the control module transmits a request command to a network communication module for cancelling the registration to the packet switched network and keeping registering to a circuit switched network.

6. The mobile communication apparatus according to claim 5, wherein the network communication module stops receiving a packet data protocol context when connecting to the wireless network.

7. The mobile communication apparatus according to claim 6, further comprising:
   the network communication module receives the packet data protocol context continuously when disconnecting to the wireless network.

8. The mobile communication apparatus according to claim 5, further comprising:
   the network communication module keeps registering to the packet switched network when disconnecting to the wireless network.

9. The mobile communication apparatus according to claim 5, wherein the network communication module comprises:
   a mobile data module configured to register or unregister the circuit switched network, register or unregister the packet switched network, or receive or stop receiving a packet data protocol context; and
   a wireless network module configured to connect to the wireless network, wherein the wireless network conforms to the wireless communication protocol of Wi-Fi, LTE, and Bluetooth standard.

* * * * *